US011808881B2

(12) United States Patent
Arkind et al.

(10) Patent No.: US 11,808,881 B2
(45) Date of Patent: Nov. 7, 2023

(54) APPARATUS AND METHOD OF TWO-STAGE SIGNAL PROCESSING IN A RADAR SYSTEM

(71) Applicant: ARBE ROBOTICS LTD., Tel Aviv (IL)

(72) Inventors: Noam Arkind, Givatayim (IL); Ben Rathaus, Kadima (IL); Tom Altus, Raanana (IL); Yoram Stettiner, Keren Maharal (IL)

(73) Assignee: Arbe Robotics Ltd.

( * ) Notice: Subject to any disclaimer, the term of this patent is extended or adjusted under 35 U.S.C. 154(b) by 494 days.

(21) Appl. No.: 17/261,076

(22) PCT Filed: Jun. 29, 2019

(86) PCT No.: PCT/IL2019/050719
§ 371 (c)(1),
(2) Date: Jan. 18, 2021

(87) PCT Pub. No.: WO2020/016877
PCT Pub. Date: Jan. 23, 2020

(65) Prior Publication Data
US 2021/0318413 A1    Oct. 14, 2021

(30) Foreign Application Priority Data
Jul. 19, 2018 (IL) .......................... 260694

(51) Int. Cl.
*G01S 7/35* (2006.01)
*G01S 13/536* (2006.01)
(Continued)

(52) U.S. Cl.
CPC ............ *G01S 7/352* (2013.01); *G01S 13/536* (2013.01); *G01S 13/584* (2013.01); *G01S 13/931* (2013.01); *G01S 2013/0245* (2013.01)

(58) Field of Classification Search
CPC .... G01S 13/931; G01S 13/343; G01S 13/345; G01S 13/347; G01S 13/584;
(Continued)

(56) References Cited

U.S. PATENT DOCUMENTS 3,603,989 A * 9/1971 Caspers ................ G01S 13/106
342/195
3,981,012 A 9/1976 Brault
(Continued)

FOREIGN PATENT DOCUMENTS

CN    1967286 A    5/2007
CN    1967286 A1   5/2007
(Continued)

OTHER PUBLICATIONS

Jason Yu et al: "Multiband chirp synthesis for frequency-hopped FMCW radar", Signals, Systems and Computers, 2009 Conference Record of the Forty-Third Asilomar Conference on, IEEE, Piscataway, NJ, USA, Nov. 1, 2009 (Nov. 1, 2009), pp. 1315-1319, XP031679466, ISBN: 978-1-4244-5825-7.
(Continued)

*Primary Examiner* — Vladimir Magloire
*Assistant Examiner* — Michael W Justice
(74) *Attorney, Agent, or Firm* — Zaretsky Group PC; Howard Zaretsky

(57) ABSTRACT

A novel and useful two-stage radar return data processing mechanism for use in FMCW radar systems that divides the conventional frame into two portions. Two different frames are transmitted rather than one. The frames are transmitted consecutively one after the other. A low resolution 'coarse' frame is first transmitted that is fully processed in real time. Based on the results of the processing of the coarse frame, a plurality of targets of interest (TOIs) in the scene representing a subset of the received data is determined. Then a
(Continued)

longer high-resolution 'fine' frame is transmitted and processed using the information obtained in the previous coarse fame. Using the TOI information obtained in the previous coarse frame, only a subset of the received data is processed. The non-processed portion is assumed to contain non-interesting information and is discarded or ignored thereby significantly reducing processing time.

22 Claims, 11 Drawing Sheets

(51) Int. Cl.
    *G01S 13/58*     (2006.01)
    *G01S 13/931*     (2020.01)
    *G01S 13/02*     (2006.01)

(58) Field of Classification Search
    CPC ........ G01S 13/536; G01S 13/89; G01S 7/356; G01S 7/292; G01S 7/2883; G01S 2013/0245; G01S 2013/0254
    USPC ................................ 342/128, 179, 196, 195
    See application file for complete search history.

(56) References Cited

U.S. PATENT DOCUMENTS

| | | | | |
|---|---|---|---|---|
| 4,166,980 | A | 9/1979 | Apostolos | |
| 4,197,540 | A | 4/1980 | Riggs | |
| 4,490,720 | A * | 12/1984 | Kuntman | G01S 13/953 342/26 B |
| 4,494,083 | A | 1/1985 | Josefsson | |
| 4,926,185 | A | 5/1990 | Wittenberg | |
| 5,063,603 | A | 11/1991 | Burt | |
| 5,254,999 | A * | 10/1993 | Lee | G01S 7/2923 342/185 |
| 5,424,742 | A | 6/1995 | Long | |
| 5,430,445 | A | 7/1995 | Peregrim | |
| 5,442,362 | A * | 8/1995 | Zwarts | G01S 13/10 342/197 |
| 5,465,095 | A * | 11/1995 | Bryant | G01S 13/5244 342/162 |
| 5,694,130 | A * | 12/1997 | Suzuki | G01S 13/34 342/72 |
| 5,923,280 | A | 7/1999 | Farmer | |
| 5,955,992 | A | 9/1999 | Shattil | |
| 6,028,548 | A | 2/2000 | Farmer | |
| 6,104,673 | A | 8/2000 | Cole | |
| 6,172,939 | B1 | 1/2001 | Cole | |
| 6,204,803 | B1 | 3/2001 | Uehara | |
| 6,363,033 | B1 | 3/2002 | Cole | |
| 6,614,384 | B2 | 9/2003 | Hall | |
| 6,822,604 | B2 | 11/2004 | Hall | |
| 6,828,929 | B2 | 12/2004 | Barbella | |
| 6,865,216 | B1 | 3/2005 | Beamish | |
| 6,888,887 | B1 | 5/2005 | Shattil | |
| 6,989,782 | B2 | 1/2006 | Walker | |
| 7,071,868 | B2 | 7/2006 | Woodington | |
| 7,119,733 | B2 * | 10/2006 | Schoeberl | G01S 7/032 342/373 |
| 7,129,886 | B2 | 10/2006 | Hall | |
| 7,148,840 | B2 * | 12/2006 | Dooi | G01S 13/08 342/131 |
| 7,308,043 | B1 | 12/2007 | Frank | |
| 7,372,394 | B1 * | 5/2008 | Woodell | G01S 13/106 342/26 B |
| 7,528,765 | B1 * | 5/2009 | Woodell | G01S 13/953 342/26 B |
| 7,541,968 | B2 | 6/2009 | Hall | |
| 7,639,171 | B2 * | 12/2009 | Alland | H01Q 3/24 342/25 R |
| 7,804,445 | B1 | 9/2010 | Fiore | |
| 7,835,455 | B2 | 11/2010 | Shattil | |
| 7,859,450 | B2 * | 12/2010 | Shirakawa | G01S 13/87 342/147 |
| 7,903,038 | B2 * | 3/2011 | Tietjen | H01Q 25/005 343/700 R |
| 8,035,038 | B2 | 10/2011 | Cheng | |
| 8,175,134 | B1 | 5/2012 | Giallorenzi | |
| 8,184,040 | B2 * | 5/2012 | Takase | G01S 13/426 342/134 |
| 8,599,062 | B2 | 12/2013 | Szajnowski | |
| 8,762,139 | B2 | 6/2014 | Furuta | |
| 8,803,732 | B2 | 8/2014 | Antonik | |
| 8,970,425 | B2 | 3/2015 | Nogueira-Nine | |
| 8,976,061 | B2 * | 3/2015 | Chowdhury | G01S 13/584 343/700 R |
| 9,250,322 | B2 | 2/2016 | Newman | |
| 9,341,705 | B2 * | 5/2016 | Yannone | G01S 7/292 |
| 9,557,585 | B1 | 1/2017 | Yap | |
| 9,645,228 | B1 | 5/2017 | Doerry | |
| 9,791,564 | B1 | 10/2017 | Harris | |
| 9,880,275 | B2 * | 1/2018 | Jeong | B60W 30/14 |
| 10,078,129 | B2 | 9/2018 | Sugino | |
| 10,082,570 | B1 | 9/2018 | Izadian | |
| 10,094,920 | B2 | 10/2018 | Rao | |
| 10,168,419 | B2 * | 1/2019 | Trummer | G01S 7/41 |
| 10,359,504 | B2 | 7/2019 | Fetterman | |
| 10,451,723 | B2 | 10/2019 | Chiu | |
| 11,199,617 | B2 | 12/2021 | Hakobyan | |
| 11,277,902 | B2 | 3/2022 | Snir | |
| 2002/0016547 | A1 | 2/2002 | Bang | |
| 2002/0044082 | A1 | 4/2002 | Woodington | |
| 2002/0130807 | A1 | 9/2002 | Hall | |
| 2003/0151476 | A1 | 8/2003 | Salmela | |
| 2004/0021599 | A1 | 2/2004 | Hall | |
| 2004/0150552 | A1 | 8/2004 | Barbella | |
| 2004/0164891 | A1 * | 8/2004 | Schoeberl | H01Q 3/40 342/174 |
| 2004/0196172 | A1 | 10/2004 | Wasiewicz | |
| 2005/0083199 | A1 | 4/2005 | Hall | |
| 2005/0156780 | A1 | 7/2005 | Bonthron | |
| 2005/0232182 | A1 | 10/2005 | Shattil | |
| 2006/0012511 | A1 * | 1/2006 | Dooi | G01S 13/87 342/111 |
| 2007/0040728 | A1 | 2/2007 | Nishimura | |
| 2007/0171123 | A1 | 7/2007 | Nakano | |
| 2007/0205847 | A1 | 9/2007 | Kushta | |
| 2008/0111686 | A1 | 5/2008 | Hall | |
| 2008/0136718 | A1 * | 6/2008 | Tietjen | H01Q 1/1235 343/711 |
| 2008/0258964 | A1 | 10/2008 | Schoeberl | |
| 2008/0284641 | A1 | 11/2008 | Spreadbury | |
| 2008/0317345 | A1 | 12/2008 | Wiedemann | |
| 2009/0079617 | A1 * | 3/2009 | Shirakawa | G01S 13/87 342/146 |
| 2009/0085800 | A1 * | 4/2009 | Alland | G01S 13/343 342/25 R |
| 2010/0074620 | A1 | 3/2010 | Linnartz | |
| 2010/0141508 | A1 | 6/2010 | Nguyen | |
| 2011/0122014 | A1 | 5/2011 | Szajnowski | |
| 2011/0279669 | A1 | 11/2011 | Longstaff | |
| 2012/0056780 | A1 | 3/2012 | Antonik | |
| 2012/0112955 | A1 | 5/2012 | Ando | |
| 2012/0146846 | A1 | 6/2012 | Antonik | |
| 2012/0169523 | A1 | 7/2012 | Lee | |
| 2012/0235859 | A1 | 9/2012 | Hayase | |
| 2012/0313810 | A1 | 12/2012 | Nogueira-Nine | |
| 2013/0009806 | A1 | 1/2013 | Newman | |
| 2013/0027240 | A1 * | 1/2013 | Chowdhury | G01S 13/345 342/175 |
| 2013/0257670 | A1 | 10/2013 | Sovero | |
| 2014/0022113 | A1 | 1/2014 | Nogueira-Nine | |
| 2014/0079248 | A1 | 3/2014 | Short | |
| 2014/0105043 | A1 | 4/2014 | Balleste | |
| 2014/0211438 | A1 | 7/2014 | Lin | |
| 2014/0218226 | A1 | 8/2014 | Raz | |
| 2014/0320231 | A1 | 10/2014 | Seler | |
| 2014/0355385 | A1 * | 12/2014 | Inagaki | G01S 15/878 367/99 |

(56) References Cited

U.S. PATENT DOCUMENTS

| | | |
|---|---|---|
| 2015/0042507 A1* | 2/2015 | Jeong .................... G01S 13/345 |
| | | 342/175 |
| 2015/0061928 A1 | 3/2015 | Cornic |
| 2015/0268329 A1* | 9/2015 | Yannone ................. G01S 7/292 |
| | | 342/146 |
| 2015/0323650 A1 | 11/2015 | Schuman |
| 2016/0018511 A1 | 1/2016 | Nayyar |
| 2016/0025839 A1* | 1/2016 | Trummer .............. G01S 13/931 |
| | | 342/188 |
| 2016/0061942 A1 | 3/2016 | Rao |
| 2016/0084941 A1 | 3/2016 | Arage |
| 2016/0131738 A1 | 5/2016 | Prechtel |
| 2016/0139254 A1 | 5/2016 | Wittenberg |
| 2016/0187477 A1 | 6/2016 | Wang |
| 2016/0285611 A1 | 9/2016 | Fischer |
| 2016/0291146 A1 | 10/2016 | Wang |
| 2016/0334502 A1 | 11/2016 | Ali |
| 2016/0377711 A1 | 12/2016 | Arage |
| 2017/0131394 A1 | 5/2017 | Roger |
| 2017/0219689 A1 | 8/2017 | Hung |
| 2017/0307744 A1 | 10/2017 | Loesch |
| 2017/0343648 A1 | 11/2017 | Trotta |
| 2018/0045819 A1 | 2/2018 | Cornic |
| 2018/0074168 A1 | 3/2018 | Subburaj |
| 2018/0095162 A1 | 4/2018 | Fetterman |
| 2018/0095173 A1* | 4/2018 | Kurono ................. G01S 13/343 |
| 2018/0149736 A1 | 5/2018 | Alland |
| 2018/0159246 A1 | 6/2018 | Raphaeli |
| 2018/0166794 A1 | 6/2018 | Raphaeli |
| 2018/0172816 A1 | 6/2018 | Chiu |
| 2018/0188317 A1 | 7/2018 | Maiellaro |
| 2018/0204358 A1 | 7/2018 | An |
| 2018/0350751 A1 | 12/2018 | Sun |
| 2019/0004167 A1 | 1/2019 | Rao |
| 2019/0050372 A1 | 2/2019 | Zeng |
| 2019/0212428 A1 | 7/2019 | Santra |
| 2019/0235066 A1 | 8/2019 | Lida |
| 2019/0265346 A1 | 8/2019 | Hakobyan |
| 2019/0324136 A1 | 10/2019 | Amadjikpe |
| 2019/0339382 A1 | 11/2019 | Hess |
| 2020/0003884 A1 | 1/2020 | Arkind |
| 2020/0011968 A1 | 1/2020 | Hammes |
| 2020/0176393 A1 | 6/2020 | Ketterson |
| 2020/0241672 A1* | 7/2020 | Kushnir .................. G01S 13/87 |
| 2020/0301002 A1 | 9/2020 | Wu |
| 2020/0388578 A1 | 12/2020 | Lim |
| 2020/0393536 A1 | 12/2020 | Stettiner |
| 2021/0156980 A1 | 5/2021 | Stettiner |
| 2021/0156981 A1 | 5/2021 | Stettiner |
| 2021/0156982 A1 | 5/2021 | Stettiner |
| 2021/0184340 A1 | 6/2021 | Stav |
| 2021/0263147 A1 | 8/2021 | Bauer |
| 2021/0275056 A1 | 9/2021 | McMahon |
| 2021/0293923 A1 | 9/2021 | Arkind |
| 2021/0320425 A1 | 10/2021 | Arkind |

FOREIGN PATENT DOCUMENTS

| | | |
|---|---|---|
| CN | 101950851 A | 1/2011 |
| CN | 102866401 A | 1/2013 |
| CN | 104793192 A | 7/2015 |
| CN | 105814262 A | 7/2016 |
| CN | 105842700 A | 8/2016 |
| CN | 106100696 A | 11/2016 |
| CN | 106249219 A | 12/2016 |
| CN | 107356920 A | 11/2017 |
| CN | 107683422 A2 | 2/2018 |
| CN | 108089163 A | 5/2018 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 3165941 A1 | 5/2017 |
| GB | 2462148 A | 2/2010 |
| WO | 2008/143943 A1 | 11/2008 |
| WO | 2013/045232 A1 | 4/2013 |
| WO | 2015/126505 A2 | 8/2015 |
| WO | 2016/188895 A1 | 12/2016 |
| WO | 2017/069679 A1 | 4/2017 |
| WO | 2017/208670 A1 | 12/2017 |
| WO | 2018/138725 A1 | 8/2018 |
| WO | 2018/142395 A1 | 8/2018 |
| WO | 2018/142396 A1 | 8/2018 |

OTHER PUBLICATIONS

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPCO.2017.8081546 [retrieved on Oct. 23, 2017].

Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 17, 2018).

U. Prechtel et al.: "Short-Range Mimo Radar System Considerations", 2012 6th European Conference on Antennas and Propagation (EUCAP), Mar. 1, 2012 (Mar. 1, 2012), pp. 1742-1745, Xp055147564, DOI: 10.1109/EUCAP.2012.6206599, ISBN: 978-1-45-770919-7.

Comparative Performance Analysis of Hamming, Hanning and Blackman Window by Prajoy Podder at International Journal of Computer Applications (0975-8887) vol. 96—No. 18, Jun. 2014 (Year: 2014).

* cited by examiner

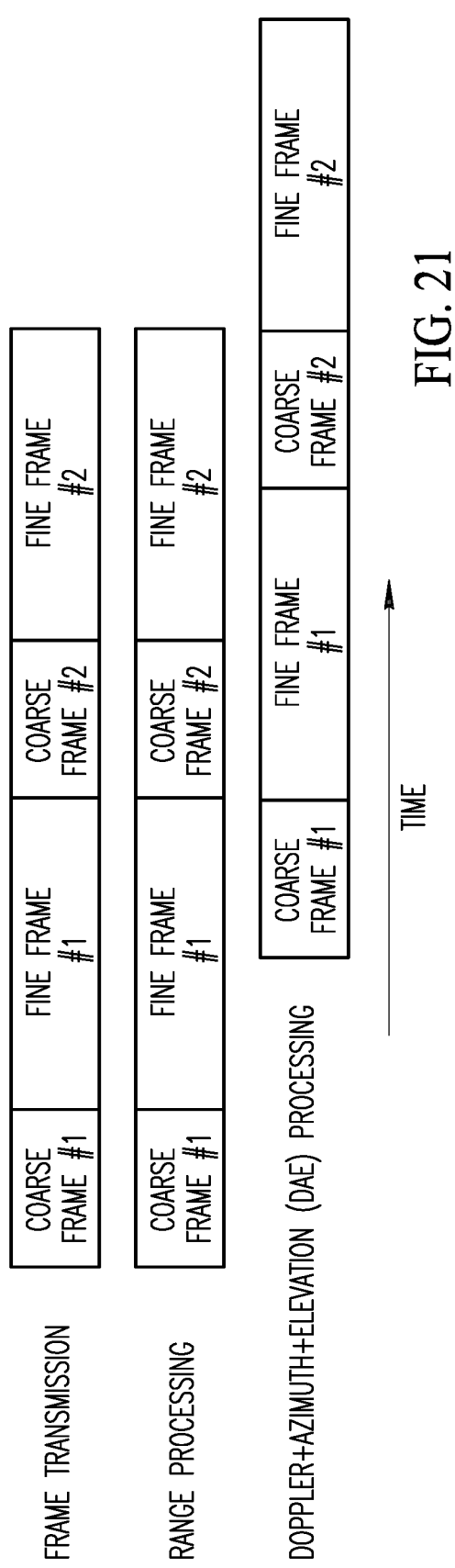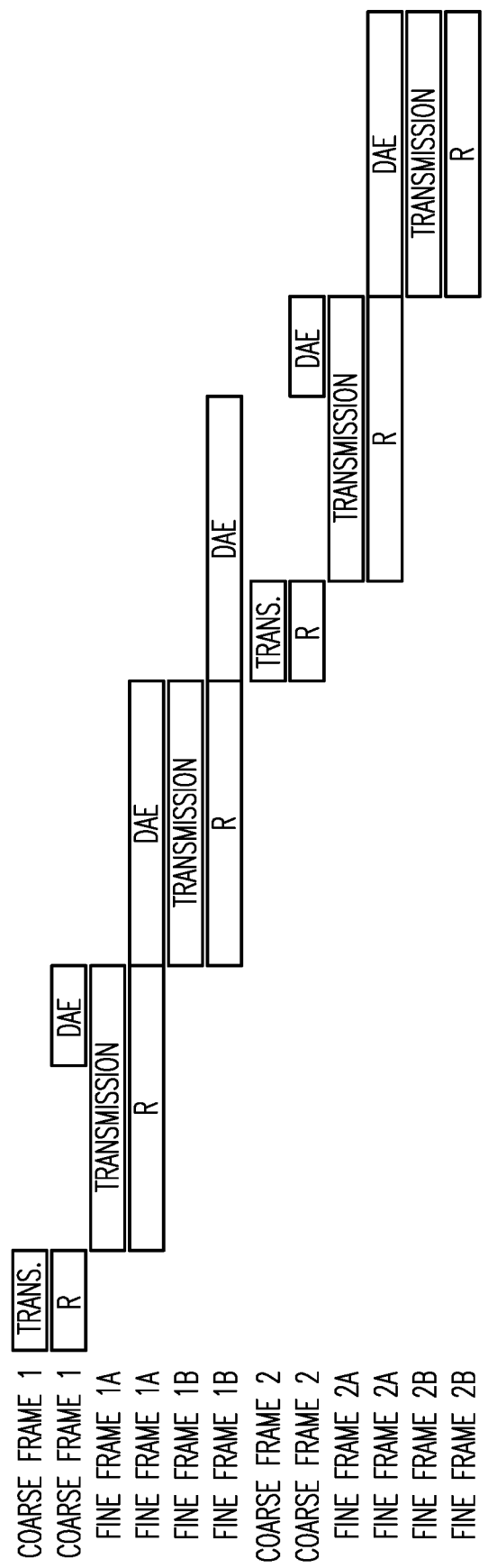

APPARATUS AND METHOD OF TWO-STAGE SIGNAL PROCESSING IN A RADAR SYSTEM

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to a system and method of two-stage signal processing in an FMCW radar system.

BACKGROUND OF THE INVENTION

Recently, applications of radars in the automotive industry have started to emerge. High-end automobiles already have radars that provide parking assistance and lane departure warning to the driver. Currently, there is a growing interest in the self-driving cars and some people consider it to be the main driving force of the automotive industry in the coming years. Self-driving cars offer a new perspective on the application of the radar technology in automobiles. Instead of only assisting the driver, automotive radars should be capable of taking an active role in the control of the vehicle. They are thus likely to become a key sensor of the autonomous control system of a car.

Radar is preferred over the other alternatives such as sonar or LIDAR as it is less affected by the weather conditions and can be made very small to decrease the effect of the deployed sensor to the vehicle's aerodynamics and appearance. The Frequency Modulated Continuous Wave (FMCW) radar is a type of radar that offers more advantages compared to the others. It ensures the range and velocity information of the surrounded objects can be detected simultaneously. This information is very crucial for the control system of the self-driving vehicle to provide safe and collision-free operation.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles, especially cars, are increasingly equipped with technologies designed to assist the driver in critical situations. Besides cameras and ultrasonic sensors, car makers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in the time and frequency domains, even up to frequencies of 500 GHz.

There is also much interest now in using radar in the realm of autonomous vehicles which is expected to become more prevalent in the future. Millimeter wave automotive radar is suitable for use in the prevention of car collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object struck by the transmitted radar signal.

Advanced driver assistance systems (ADAS) are systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources separate from the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest-growing segments in automotive electronics, with steadily increasing rates of adoption of industry-wide quality standards, in vehicular safety systems ISO 26262, developing technology specific standards, such as IEEE 2020 for Image Sensor quality and communications protocols such as the Vehicle Information API.

Functional safety features form an integral part of each automotive product development phase, ranging from the specification, to design, implementation, integration, verification, validation, and production release. The ISO 26262 standard is an adaptation of the Functional Safety standard IEC 61508 for Automotive Electric/Electronic Systems. ISO 26262 defines functional safety for automotive equipment applicable throughout the lifecycle of all automotive electronic and electrical safety-related systems. The first edition addresses possible hazards caused by the malfunctioning behavior of electronic and electrical systems. The standard relates to the functional safety of electrical and electronic systems as well as that of systems as a whole or of their mechanical subsystems. Note that the standard is a risk-based safety standard, where the risk of hazardous operational situations is qualitatively assessed and safety measures are defined to avoid or control systematic failures and to detect or control random hardware failures or mitigate their effects.

Several goals of Goals of ISO 26262 include (1) providing an automotive safety lifecycle, i.e. management, development, production, operation, service, and decommissioning; (2) covering functional safety aspects of the entire development process, i.e. requirements specification, design, implementation, integration, verification, validation, and configuration; (3) providing an automotive-specific risk-based approach for determining risk classes called Automotive Safety Integrity Levels (ASILs); (4) using ASILs for specifying the item's necessary safety requirements for achieving an acceptable residual risk; and (5) providing requirements for validation and confirmation measures to ensure a sufficient and acceptable level of safety is being achieved.

Thus, the safety requirements for autonomous vehicles requires that safety critical devices will be able to detect faults in the operation of the devices and bring the vehicle to a halt in the case a fault is detected.

In recent years many industries are moving to autonomous solutions such as the automotive industry, deliveries etc. These autonomous platforms operate in the environment while interacting with both the stationary and moving objects. For this purpose, these systems require a sensor suite which allows them to sense their surrounding in a reliable and efficient manner. For example, in order for an autonomous vehicle to plan its route on a road with other vehicle on it, the trajectory planner must have a 3D map of the environment with indication of moving objects.

Visual sensors are also degraded by bad weather and poor visibility (e.g., fog, smoke, sand, rain or snow storms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio.

Prior art digital beam forming FMCW radars are characterized by very high resolutions across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. It is also well known that range measurement can be obtained by performing a Fourier transform on the de-ramped signal, generated by multiplying the conjugate of the transmitted signal with the received signal. The radar range resolution is determined by the RF bandwidth of the radar and is equal the speed of light 'c' divided by twice the RF bandwidth.

Doppler processing is performed by performing a Fourier transform across the time dimension, and its resolution is limited by the Coherent Processing Interval (CPI). i.e. the total transmission time used for Doppler processing.

A well-known way to reduce the number of antenna elements in an array is by using a MIMO technique known as 'virtual array', where orthogonal waveforms are transmitted from different antennas (usually simultaneously), and by means of digital processing a larger effective array is generated. The shape of this virtual array is the convolution of the transmission and reception antennas.

It is also known that by means of bandpass sampling, the de-ramped signal can be sampled with lower A/D frequencies, while preserving the range information of the targets with the ranges matching the designed bandpass filter.

In a radar system incorporating a virtual array MIMO antenna, the amount of data that is generated by receive elements which must be processed can be staggering depending on the number of receive elements in the physical array. Depending on the desired frame rate, conventional processing techniques are not sufficient to process the quantity of data. Thus, there is a need for a system capable of processing the huge amount of data generated by the receive elements in a MIMO virtual antenna array.

SUMMARY OF THE INVENTION

The present invention is a system and method of two-stage radar return data processing for use in FMCW radar systems that functions to divide the conventional frame into two portions. Two different frames are transmitted rather than one. The frames are transmitted consecutively one after the other. A low resolution 'coarse' frame is first transmitted that is fully processed in real time. Based on the results of the processing of the coarse frame, a plurality of targets of interest (TOIs) in the scene representing a subset of the received data is determined. Then a longer high-resolution 'fine' frame is transmitted and processed using the information obtained in the previous coarse fame. Using the TOI information obtained in the previous coarse frame, only a subset of the received data is processed. The non-processed portion is assumed to contain non-interesting information and is discarded or ignored.

The invention is applicable to systems in the field of imaging radar, sonar, ultrasound, and other sensors for performing range measurement via FMCW signals and/or angle measurement via digital beam forming and array processing, or any processing system where the resolution of the transmitted frames as well as the resolution of the receive data processing is adjustable.

There is thus provided in accordance with the invention, a method of processing received data in a radar system, the method comprising performing said data processing in two stages, including a low resolution first stage and a high resolution second stage, receiving coarse data from low resolution coarse frames transmitted during said first stage and processing said coarse data received at a low resolution, determining a plurality of targets of interest (TOIs) from said processed coarse frame, and receiving fine data from high resolution fine frames transmitted during said second stage and processing said fine data at high resolution only for said plurality of TOIs thereby substantially reducing processing time to generate radar output image data.

There is also provided in accordance with the invention, a radar processing unit (RPU) for processing received data in a radar system, comprising a data processing circuit operative to perform said data processing in two stages, including a low resolution first stage and a high resolution second stage, receive coarse data from low resolution coarse frames transmitted during said first stage and process said coarse data received therein at a low resolution, determine a plurality of targets of interest (TOIs) from said processed coarse frame, and receive fine data from high resolution fine frames transmitted during said second stage and processing said fine data at high resolution only for said plurality of TOIs thereby substantially reducing processing time to generate radar output image data.

There is further thus provided in accordance with the invention, an automotive radar sensor, comprising a plurality of transmitter circuits coupled to respective transmitting antennas, each transmitter circuit operative to generate and couple transmitting signals to said transmitting antennas, a plurality of receiver circuits coupled to respective receiving antennas, each receiver circuit operative to receive reflected radar return signals, a digital radar processor (DRP) operative to control said plurality of transmitter circuits and said plurality of receiver circuits and to generate a radar image from received radar return signals, said DRP comprising a radar processing unit (RPU) operative to perform processing of received radar return signals in two stages, including a low resolution first stage and a high resolution second stage, transmit low resolution coarse frames during said first stage and process data received therein at a low resolution, determine a plurality of targets of interest (TOIs) from said processed coarse frame, and transmit a high resolution fine frame during said second stage and processing at high resolution only said plurality of TOIs thereby substantially reducing processing time to generate radar output image data.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 21 is a diagram illustrating a first example timeline for range processing and velocity (Doppler)/azimuth/elevation (DAE) processing for coarse and fine frames; and FIG. 22 is a diagram illustrating a second example timeline for range processing and velocity (Doppler)/azimuth/elevation (DAE) processing for coarse and fine frames.

DETAILED DESCRIPTION

Figure 1:
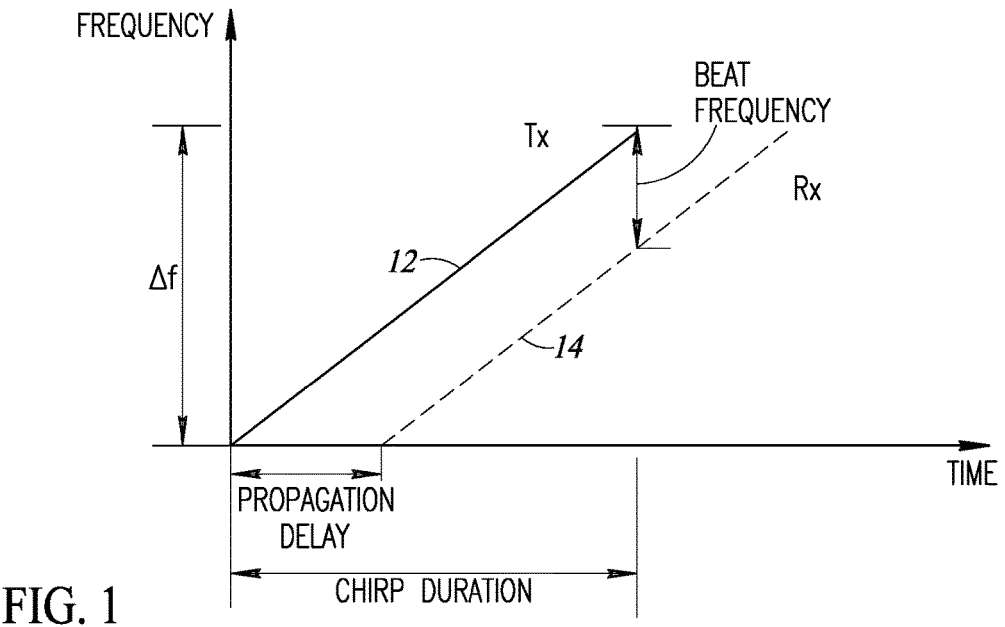
FIG. 1 is a diagram illustrating a time-frequency plot of an FMCW signal.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

A diagram illustrating a time-frequency plot of a Frequency Modulated Continuous Wave (FMCW) signal is shown in FIG. 1. In Frequency Modulated Continuous Wave (FMCW) radar, the transmit signal is generated by frequency modulating a continuous wave signal. In one sweep of the radar operation, the frequency of the transmit signal varies linearly with time. This kind of signal is also known as a chirp signal. The transmit signal 12 (solid line) sweeps through a frequency of $\Delta f$ in one chirp duration. Due to the propagation delay, the received signal 14 (dashed line) reflected from a target has a frequency difference, called the beat frequency, compared to the transmit signal. The range of the target is proportional to the beat frequency. Thus, by measuring the beat frequency, the target range can be obtained. This can be done using well-known Fast Fourier Transform (FFT) techniques due to its low computational complexity.

Figure 2:
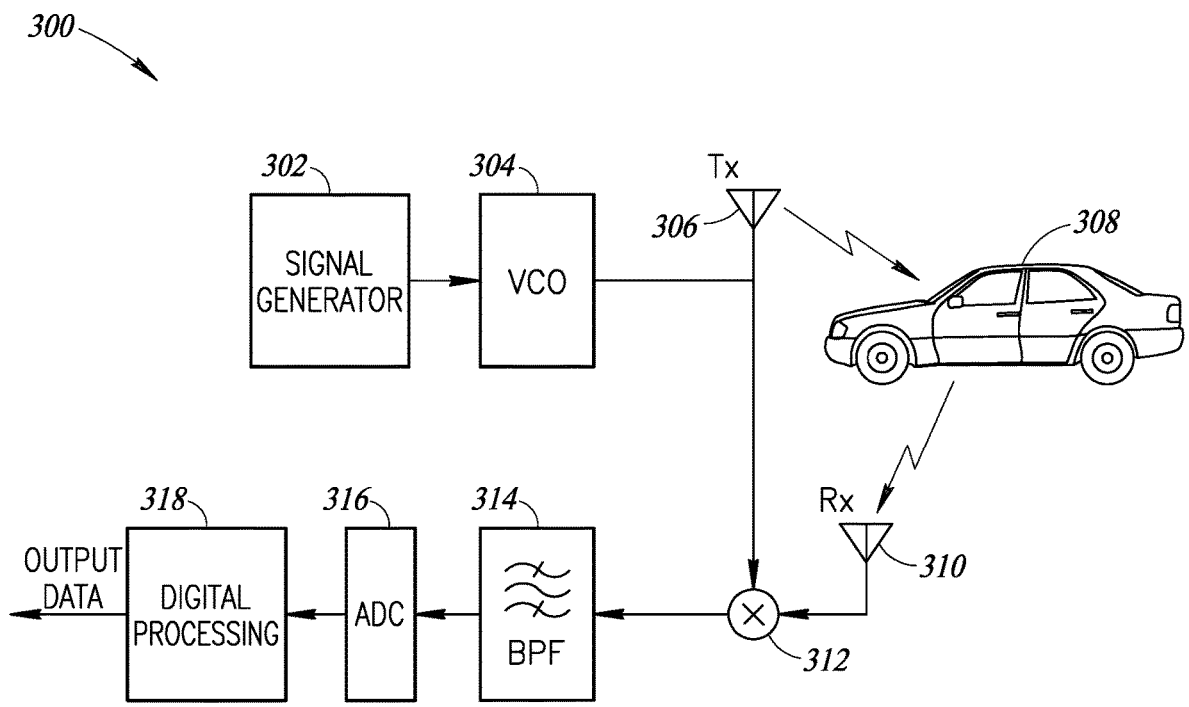
FIG. 2 is a block diagram illustrating an example FMCW radar system.

A block diagram illustrating an example FMCW radar system is shown in FIG. 2. The radar system, generally referenced 300, comprises a transmit and receive circuit. The transmit circuit comprises signal generator 302, voltage controlled oscillator (VCO) 304, and transmit antenna 306. The receive circuit comprises receive antenna 310 for receiving reflections from the target 308, mixer 312, band pass filter (BPF) 314, analog to digital converter (ADC) 316, and digital processing block 318. In operation, the transmitter generates a FMCW signal (i.e. chirps) using the signal generator and VCO. The signal is transmitted via the transmit antenna and is reflected back by the target. The received signal is mixed with the VCO output to generate the beat frequency, filtered and converted to digital for subsequent processing.

Figure 3:
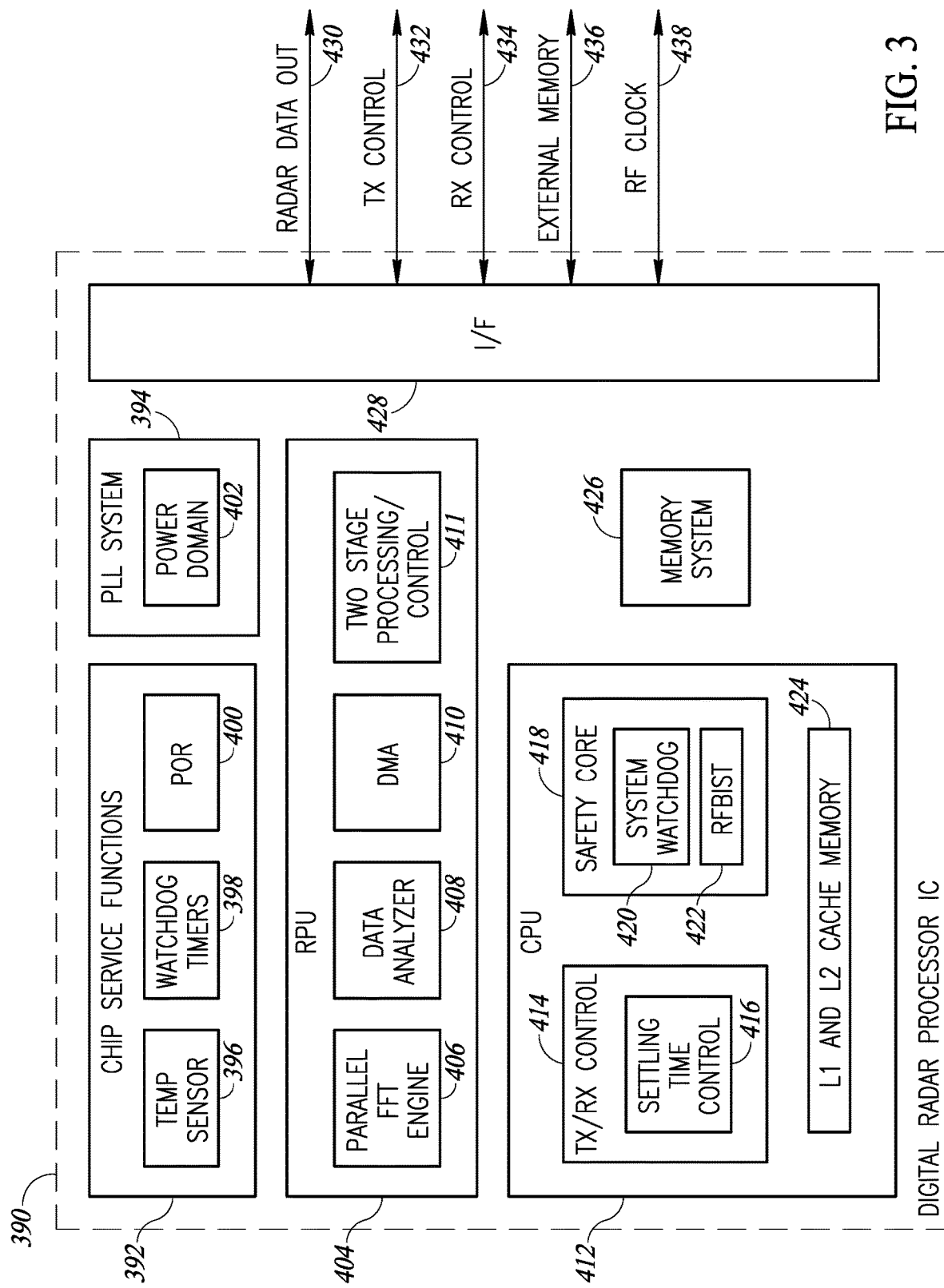
FIG. 3 is a block diagram illustrating an example digital radar processor (DRP) IC of the present invention.

A block diagram illustrating an example digital radar processor IC of the present invention is shown in FIG. 3. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408, direct memory access (DMA) circuit 410 and two-stage processing/control circuit 411, CPU block 412 including TX/RX control block 414, safety core block 418, and L1 and L2 cache memory circuit 424, memory system 426 and interface (I/F) circuit 428.

The TX/RX control circuit 414 incorporates settling time control block 416 for eliminating frequency source settling time. The safety core block 418 includes system watchdog timer circuitry 420 and RFBIST circuit adapted to perform continuous testing of the RF elements in the radar system. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

In one embodiment, the DRP 390 is used in an automotive radar FMCW MIMO based system. Such a system requires a plurality of transmitter and receiver channels to achieve desired range, azimuth, elevation and velocity. The higher the number of channels, the better the resolution performance. Depending on the implementation, multiple transmit channels may be incorporated in a single chip and multiple receive channels may be incorporated in a single chip. The system may comprise multiple TX and RX chips. Each TX and RX chip is operable as part of a larger system adapted to achieve maximum system performance. In one embodiment, the system also includes at least one control channel. The control channel is operative to configure the both TX and RX devices.

Figure 4:
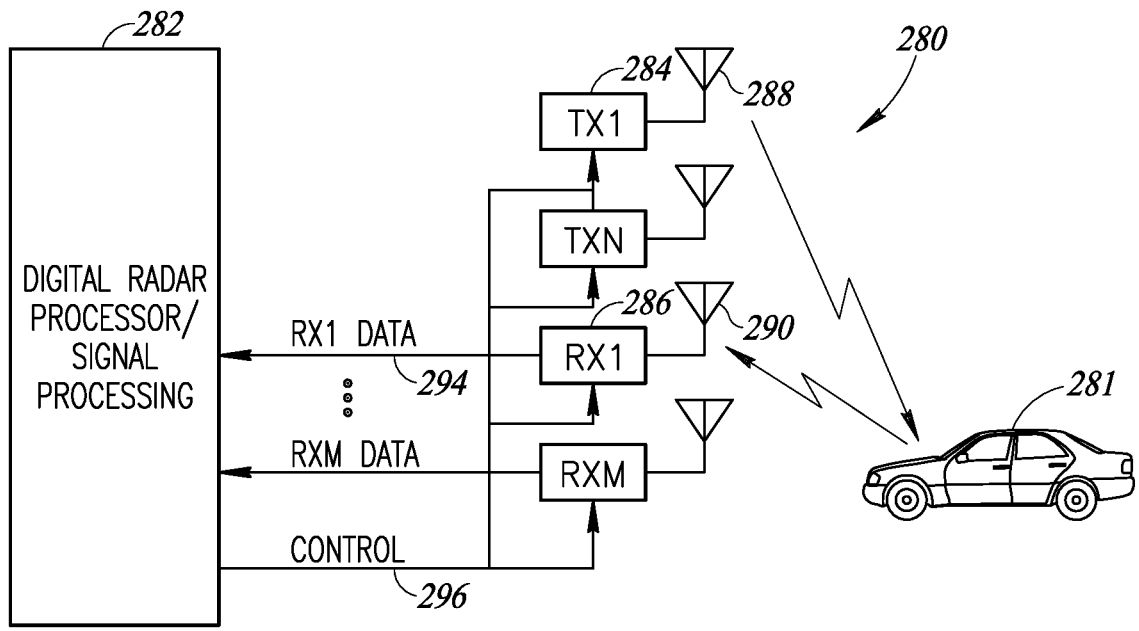
FIG. 4 is a high-level block diagram illustrating an example radar system incorporating a plurality of receivers and transmitters.

A high-level block diagram illustrating an example radar system incorporating a plurality of receivers and transmitters is shown in FIG. 4. The radar system, generally referenced 280, comprises a digital radar processor (DRP)/signal processing block for performing, inter alia, signal processing functions on the radar data, a plurality N of transmitter devices TX1 to TXN 284, each coupled to a transmit antenna 288, a plurality M of receiver devices RX1 to RXN 286, each coupled to a receive antenna 290. Note that in one embodiment the transmit and receive antennas are part of a MIMO antenna array. In one embodiment, RX lines 294 connect the receiver devices to the DRP, and control signals 296 are generated by the DRP to each of the transmitter and receiver devices, 284, 286, respectively. The transmitter devices are operative to generate and transmit chirp signals either directly or via upconversion. Note that N and M may be any positive integer greater than one.

Each transmitter circuit 284 comprises a mixer, power amplifier, and antenna. Each receive block 286 comprises an antenna, low noise amplifier (LNA), mixer, intermediate frequency (IF) block, and analog to digital converter (ADC).

Signal processing block 282 as well as one or more circuits in the DRP 390 (FIG. 3) may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the terms "sign processor" or "processor" are meant to encompass a single processor or processing unit, multiple processors, multiple processing units, or other suitably configured computing element or elements.

For example, the processor may comprise one or more general purpose CPU cores and optionally one or more special purpose cores (e.g., DSP core, floating point, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by the signal processing unit 282. The multiplication process generates two signals: one with a phase equal to the difference of the multiplied signals, and the other one with a phase equal to the sum of the phases. The sum signal is filtered out and the difference signal is processed by the signal processing unit. The signal processing unit performs all the required processing of the received digital signals and controls the transmitted signal as well. Several functions performed by the signal processing block include determining range, velocity (i.e. Doppler), azimuth and elevation, two-stage radar data processing, settling time reduction, RFBIST operations, performing interference detection, mitigation and avoidance, performing simultaneous locating and mapping (SLAM), etc.

In time multiplexed MIMO, only one transmit (TX) array element is transmitting at a time. The transmit side is greatly simplified, and there is no need for a bank of matched filters for each receive (RX) channel. The virtual array is progressively populated over the time it takes to transmit from all the TX elements in the array.

Frequency modulated continuous wave (FMCW) radars are radars in which frequency modulation is used. The theory of operation of FMCW radar is that a continuous wave with an increasing frequency is transmitted. Such a wave is referred to as a chirp.

Note that FMCW radar offers many advantages compared to the other types of radars. These include (1) the ability to measure small ranges with high accuracy; (2) the ability to simultaneously measure the target range and its relative velocity; (3) signal processing can be performed at relatively low frequency ranges, considerably simplifying the realization of the processing circuit; (4) functioning well in various types of weather and atmospheric conditions such as rain, snow, humidity, fog and dusty conditions; (5) FMCW modulation is compatible with solid-state transmitters, and moreover represents the best use of output power available from these devices; and (6) having low weight and energy consumption due to the absence of high circuit voltages.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If velocity (speed) is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency (also referred to as radial velocity) to be determined using a Fourier transform, i.e. fast Fourier transform (FFT) or discrete Fourier transform (DFT), making it possible to calculate the velocity or speed of vehicles. Note that the velocity resolution improves as the length of the measurement cycle is increased.

Multiple input multiple output (MIMO) radar is a type of radar which uses multiple TX and RX antennas to transmit and receive signals. In one embodiment, the radar comprises a time multiplexed MIMO FMCW radar. In an alternative embodiment, a full MIMO FMCW is implemented. Full MIMO radars transmit several separable signals from multiple transmit array elements simultaneously. Those signals need to be separated at each receive channel, typically using a bank of matched filters. The complete virtual array is populated at once.

Figure 5:
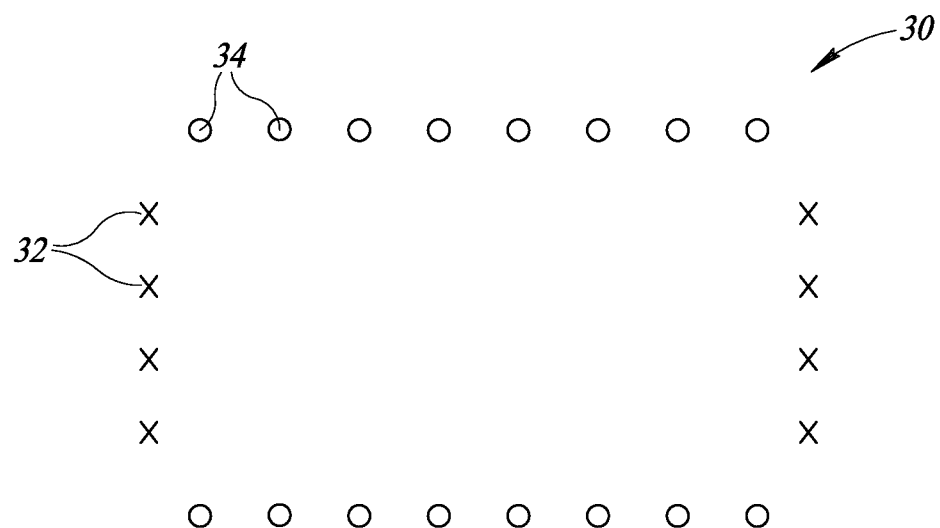
FIG. 5 is a diagram illustrating an example MIMO antenna array.

A diagram illustrating an example MIMO antenna array is shown in FIG. 5. The antenna array, generally referenced 30, comprises a plurality of transmit elements ('X') 32 and a plurality of receive elements ('O') 34. In the example shown, the physical antenna array comprises two columns of four transmit elements in each column and two rows of eight receive elements in each row.

Each transmitting antenna 32 in the array independently radiates a waveform signal which is different than the signals radiated from the other antennae. Alternatively, the signals may be identical but transmitted at nonoverlapping times. The reflected signals belonging to each transmitter antenna can be easily separated in the receiver antennas 34 since either (1) orthogonal waveforms are used in the transmission, or (2) because they are received at nonoverlapping times. A virtual array is created that contains information from each transmitting antenna to each receive antenna. Thus, providing M transmit antennas and K receive antennas results in MK independent transmit and receive antenna pairs in the virtual array by using only M+K number of physical antennas. This characteristic of MIMO radar systems results in several advantages such as increased spatial resolution, increased antenna aperture, and higher sensitivity to detect slowly moving objects.

Figure 6:
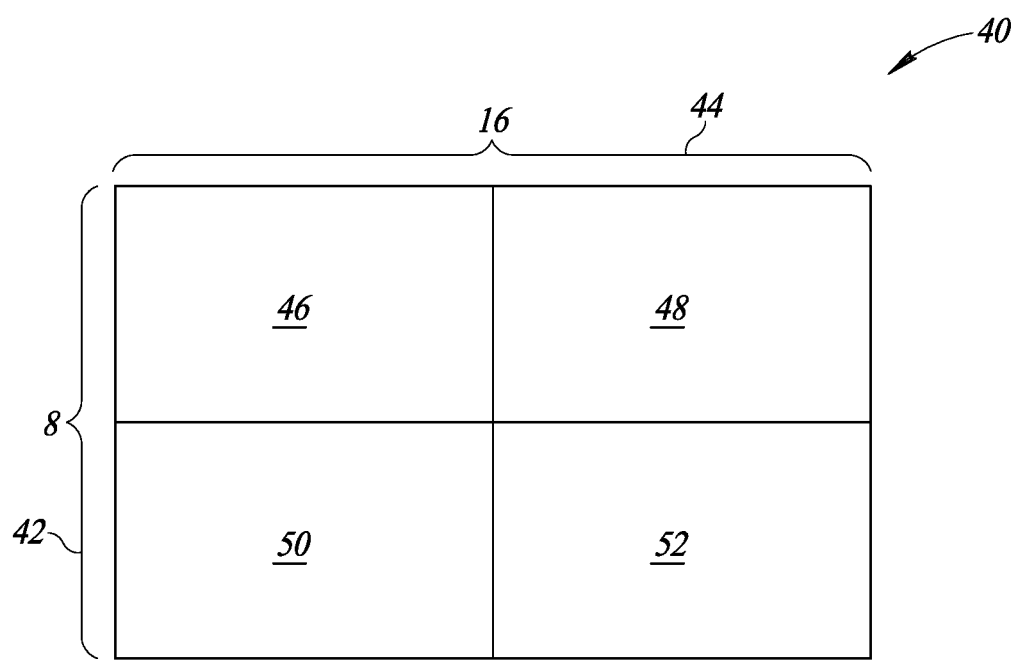
FIG. 6 is a diagram illustrating the virtual array resulting from the antenna array of FIG. 6.

A diagram illustrating the virtual array resulting from the antenna array of FIG. 5 is shown in FIG. 6. In this example, after MIMO processing, the four by eight physical antenna array results in a virtual array of eight 42 transmit elements by sixteen 44 receive elements. Thus, the original physical array size is quadrupled four times to cover combined areas 46, 48, 50, and 52 resulting in a significant increase in resolution without requiring a large number of physical elements.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

Figure 7:
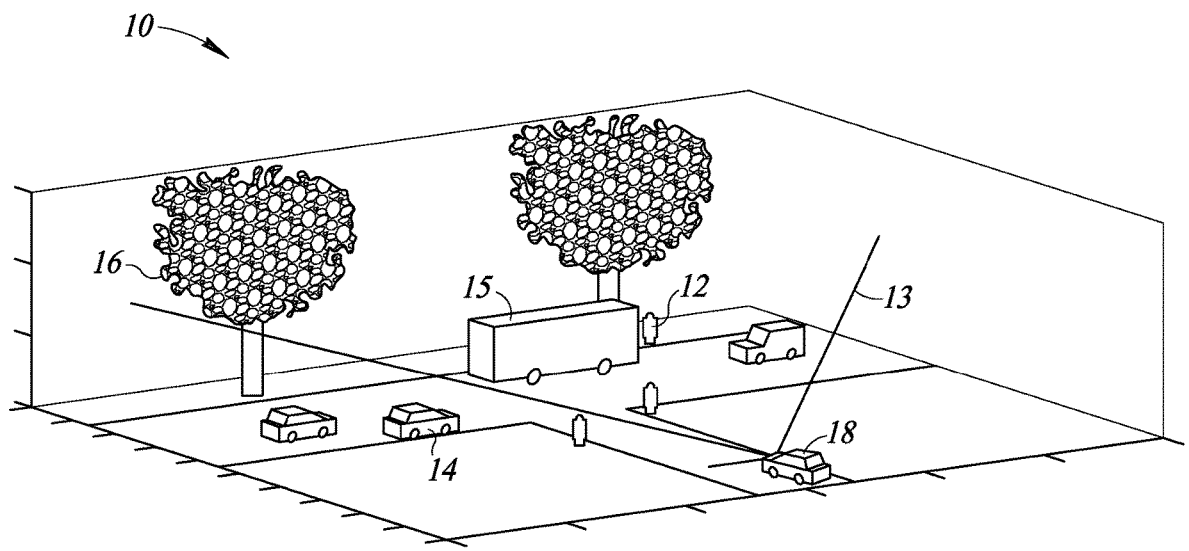
FIG. 7 is a high-level block diagram illustrating an example scene as seen by an automotive radar system.

A high-level block diagram illustrating an example scene as seen by an example automotive radar system is shown in FIG. 7. In the example scene, generally referenced 10, the radar system is installed in a vehicle 18. The antenna array of the radar generates a beam 13 that illuminates a scene in azimuth and elevation. Several targets (including for example cars 14, pedestrians 12, a bus 15, and trees 16) exist in the scene and the function of the radar is to detect these targets and provide location or image data to higher level processing in the vehicle. Typically, the vehicle will incorporate several types of sensors, including radar, optical, lidar, etc. The autonomous driving system installed in the vehicle is responsible for fusing the output of the various sensors to form a cohesive picture of the scene.

Figure 8:
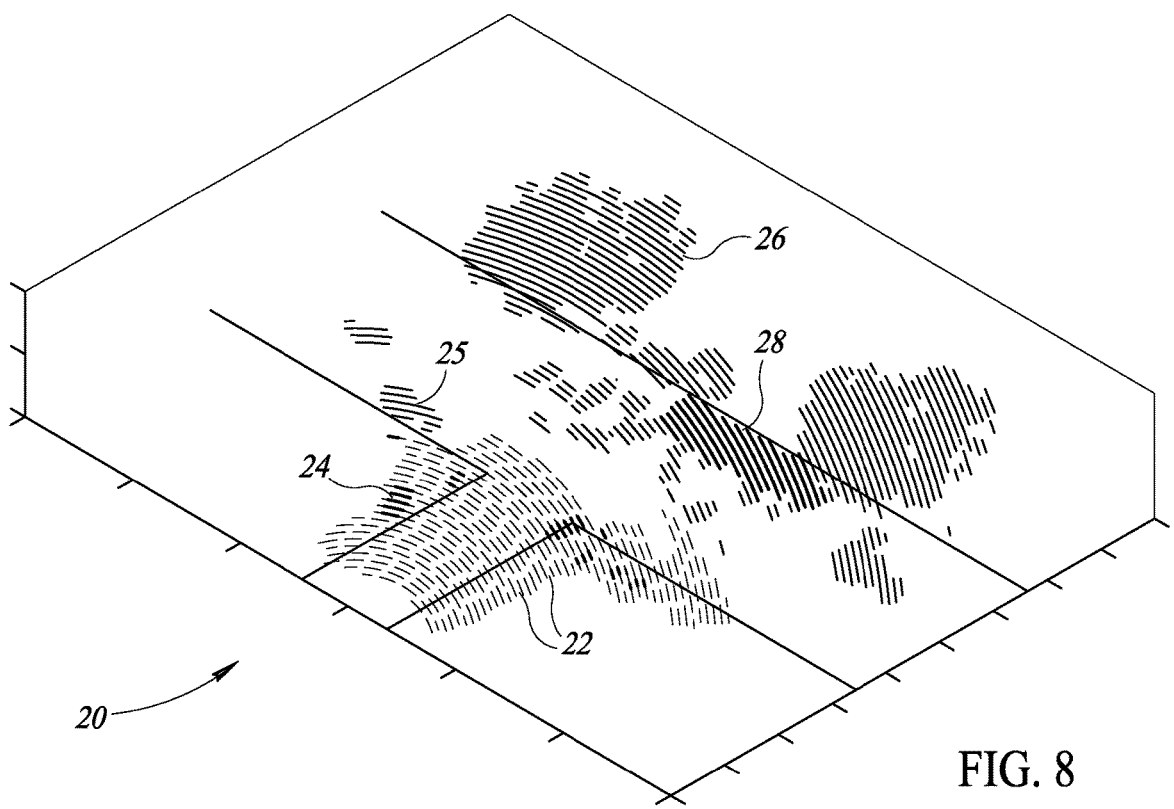
FIG. 8 is a diagram illustrating the scene of FIG. 7 after processing by the DRP of the present invention.

Example results in range, azimuth, and elevation of the radar return data from the scene in FIG. 7 and received by the virtual antenna array and processed by the DRP of the present invention is shown in FIG. 8. The image data for the scene, generally referenced 20, comprises a plurality of targets including for example cars 25, pedestrians 24, a bus 28, and trees 12). Note that each 'pixel' shown represents a bin at a particular range, azimuth, and elevation. Note also that although not shown, velocity (i.e. Doppler) information is also provided thereby constituting an image of 4D 'pixels'.

In one embodiment, the imaging radar is operative to provide a high resolution map of the observed scene in four dimensions: range, radial velocity (i.e. Doppler), azimuth, and elevation. Due to the relatively high resolution (in all four dimensions) required for autonomous cars, however, the size of this 4D data matrix is very large (e.g., tens or hundreds of Gigabits per frame, which translates to many Terabits per second). The processing of the 4D matrix is essentially a four dimensional FFT, which transforms the four dimensional input consisting of samples×chirps×number of array antenna rows×number of array antenna columns to four dimensional output consisting of range, Doppler, azimuth, and elevation. Processing the full 4D matrix of a high resolution frame, in real time, requires either (1) a very large silicon area or (2) a relatively low frame rate, both of which is impractical.

To overcome this problem, the present invention provides a two-stage processing mechanism that is capable of processing high resolution frames in real time without requiring either large areas of silicon or lowering the frame rate.

In one embodiment, the two-stage processing mechanism divides the original or conventional frame into two portions. Thus, two different frames are transmitted rather than one. The frames are transmitted consecutively one after the other. First, a low resolution 'coarse' frame is transmitted that is fully processed in real time. Based on the results of the processing of this frame in real time, a plurality of targets of interest (TOIs) in the scene representing a subset of the 4D matrix is determined. Then a longer high-resolution 'fine' frame is transmitted and processed using the information obtained in the previous coarse fame. Using the TOI information obtained in the previous coarse frame, only a subset of the 4D matrix is processed. The non-processed portion of the 4D matrix is assumed to contain non-important information and is discarded (i.e. ignored).

Note that with regard to coarse frames, the term 'fully processed' refers to received data that is processed across the entire 4D matrix, i.e. all samples across all chirps, TX and RX antenna elements to generate a 4D result, i.e. range, velocity, azimuth, and elevation. In an alternative embodiment, however, either azimuth and/or elevation processing is omitted to reduce the time, compute resources, and power required for coarse frame processing.

Note that with regard to fine frames, the term 'fully processed' refers to received data that is processed only for targets of interest, rather than the full 4D data matrix, to generate a 4D result, i.e. range, velocity, azimuth, and elevation.

Note also that one or more techniques can be used to create the high resolution fine frame. Several techniques for increasing resolution for the 4D data include: (1) increasing range resolution by increasing the bandwidth of the transmitted signal; (2) increase radial velocity (i.e. Doppler)

resolution by increasing the duration of the frame, i.e. transmitting a larger number of chirps; (3) increasing azimuth resolution by increasing the number of horizontally oriented antennas; and (4) increasing elevation resolution by increasing the number of vertically oriented antennas.

It is important to note that the radar is an active sensor (as opposed to a passive sensor like an image sensor in a digital camera), meaning that during transmission, the radar actively determines the resolution of the frame (i.e. the coarse and fine frames are transmitted differently). For example, in one embodiment, the chirps in coarse frames are shorter in duration than those in fine frames. This reduces the range resolution for the coarse frame compared to that of the fine frame. Thus, the two-stage processing mechanism of the present invention is inherently different from methods used by passive sensors such those in digital cameras, which cannot actively change the resolution of the image.

Figure 9:
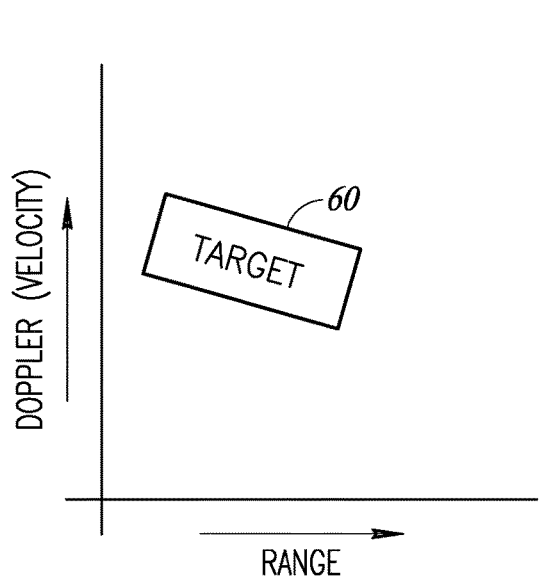
FIG. 9 is a diagram illustrating an example target in a plot of range versus velocity processing.

To illustrate the principles of the present invention, consider a diagram illustrating an example target in a plot of range versus velocity processing as shown in FIG. 9. The target 60 shown is present in the range-Doppler plane at some random point in time. When a frame is transmitted by the radar system, the parameters selected for the frame determine its resolution. In particular, the range and velocity resolutions can be controlled. Range resolution is controlled by setting the number of samples per chirp. Similarly, velocity resolution is controlled by setting the number of chirps per frame.

Figure 10:
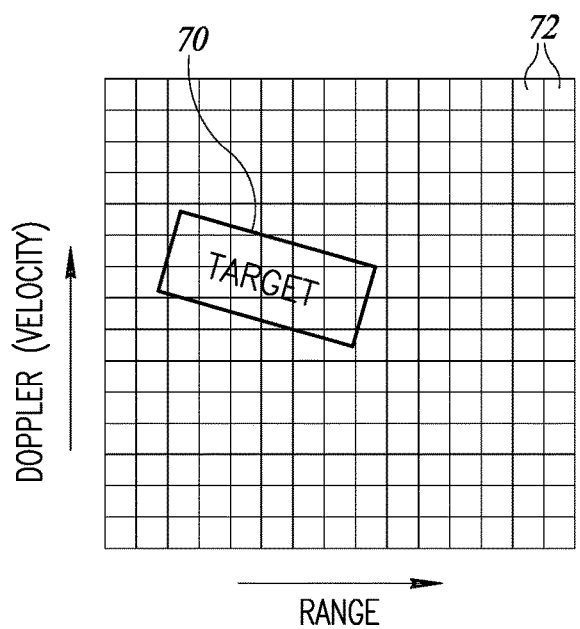
FIG. 10 is a diagram illustrating an example resolution for range and velocity bins for processed radar data.

For illustrative purposes, consider a desired resolution in the range-Doppler plane of 15 by 15. A diagram illustrating an example resolution grid for range and velocity bins for processed radar data is shown in FIG. 10. The 15×15 grid comprises a plurality of bins 72. The target 70 is shown occupying several range-Doppler bins.

In a conventional radar system, a single frame is transmitted and the radar return data is always fully processed at high resolution (i.e. the only resolution of the radar system). In other words, the entire 15×15 grid is always processed. This requires calculating 15×15=225 points in the grid, regardless of whether targets exist or not.

Figure 11:
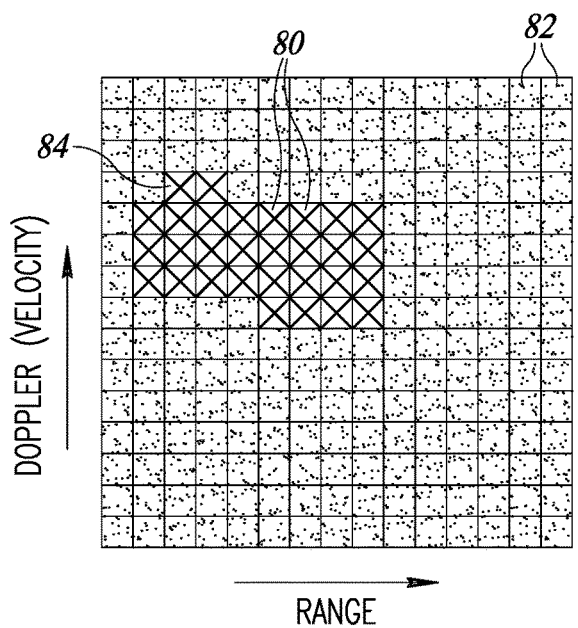
FIG. 11 is a diagram illustrating radar data processing for range and velocity bins covering the target and those not covering the target.

Consider for example a diagram illustrating radar data processing for range and velocity bins covering the target and those not covering the target as shown in FIG. 11. Here, the bins making up the grid are either speckled 82 representing points that are processed for which no target was detected or have an 'X' 80 indicating points that are processed for which a target 84 was detected. Note that although most of the points in the grid contain no target information, the entire grid is processed in each frame. Most of the points (bins) in the grid, however, are not needed (i.e. do not need to be processed) as they do not contain target information.

Figure 12:
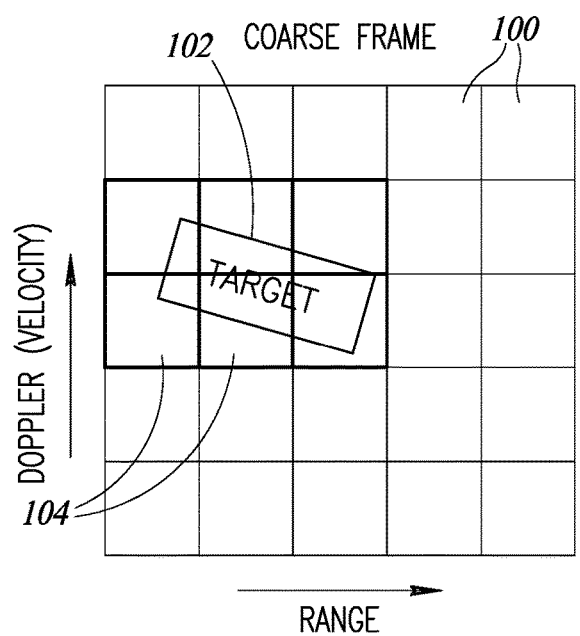
FIG. 12 is a diagram illustrating an example coarse frame incorporating low resolution range and velocity bins.
Figure 13:
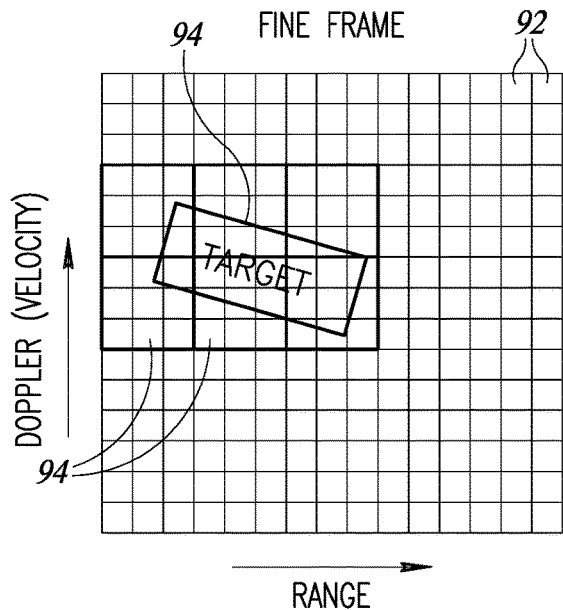
FIG. 13 is a diagram illustrating an example fine frame incorporating high resolution range and velocity bins.

In one embodiment, in order to meet the resolution and frame rate requirements of an imaging radar for autonomous vehicles, the radar system of the present invention uses two different types of frames. A low resolution coarse frame is first transmitted followed by a high resolution fine frame. In the example provided herein, the coarse frame comprises 5×5 grid such as shown in FIG. 12. The grid now contains a total of only 25 points. Most of the points 100 contain no target information while only six 104 contain data on the target 102. Coarse frame processing only requires calculating 5×5=25 points, as opposed to the 225 points required for the high resolution fine frame. Note that the entire coarse frame is always processed. If there are any targets found, their location/position is stored in memory for use in fine frame processing. Thus, for example, considering the example target 102, six of the 25 points must be processed during fine frame processing. In the fine frame, the grid of 15×15 resolution is used, as shown in FIG. 13. The grid comprises high resolution points, including points 92 that do not contain any target and points 94 that do contain target 90 data. Compared to conventional radar processing, rather than always process the full high resolution frame, the present invention does not process the full high resolution frame. Rather, only those points with target information are processed at high resolution.

Considering the example, only the high resolution points within the six low resolution points 94 covering the target 90 are processed. Each low resolution point comprises 3×3=9 point. Therefore only 6×9=54 points are processed. Thus, instead of processing 15×15=225 points every frame, the mechanism of the present invention only requires processing 5×5=25 points in the coarse frame plus 6×9=54 points in the fine frame for a total of 25+54=79 points.

Figure 14:
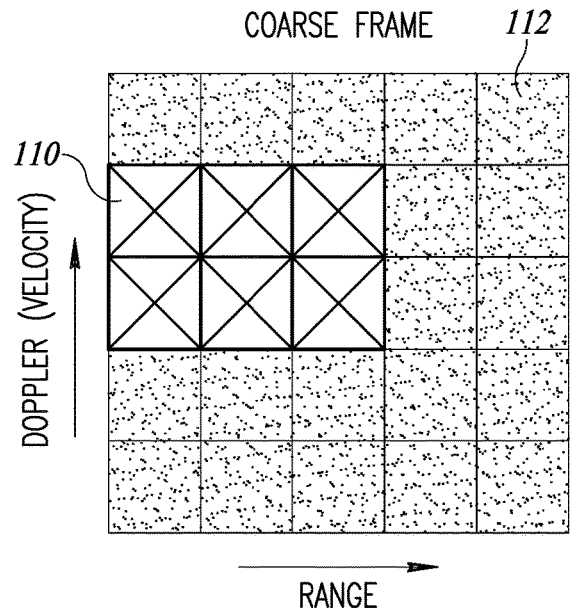
FIG. 14 is a diagram illustrating coarse frame radar data processing for range and velocity bins covering the target and those not covering the target.

A diagram illustrating coarse frame radar data processing for range and velocity bins covering the target and those not covering the target is shown in FIG. 14. In this example, speckled points 112 represent points processed but no target was detected, while 'X' points 110 represent points processed and a target was detected. The points where a target was detected are referred to as targets of interest (TOIs) and stored in memory and used subsequently during fine frame processing.

Figure 15:
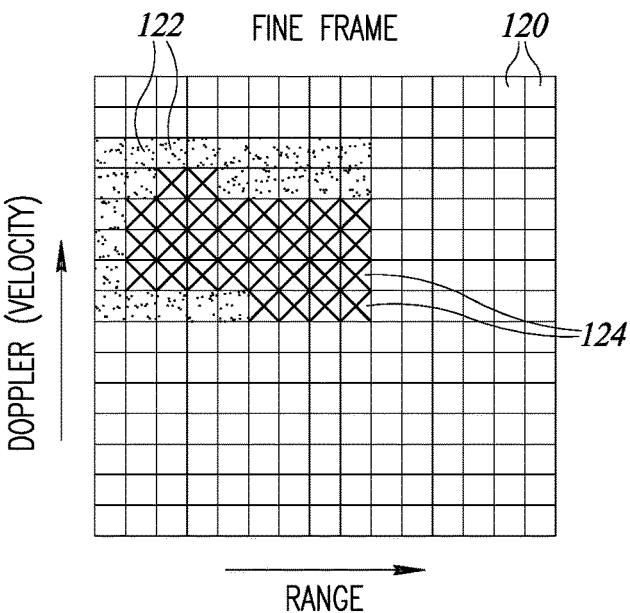
FIG. 15 is a diagram illustrating fine frame radar data processing for range and velocity bins covering the target, those not covering the target, and those not processed at all.

A diagram illustrating fine frame radar data processing for range and velocity bins covering the target, those not covering the target, and those not processed at all is shown in FIG. 15. In this example, speckled points 122 represent points processed but no target was detected, 'X' points 124 represent points processed and a target was detected, and empty points 120 represent points that are not processed at all (i.e. discarded or ignored) in accordance with the invention. The TOIs generated during the coarse frame processing are the only points that are fully processed during fine frames. All non-TOI points (i.e. data) are discarded or ignored since they do not contain interesting target information.

Note that in this illustrative example, the ratio between the full high resolution grid size of 225 points using conventional processing versus 79 points for the two-stage processing of the present invention may not seem that high. In real world systems, however, the difference is much larger. For example, a full high resolution grid size of 20 billion points is required to generate one frame which is practically impossible. On the other hand, processing a quarter or half a million points to generate one frame using the two-stage mechanism of the present invention is reasonable to achieve, thus making real-time imaging radars realizable.

Figure 16:
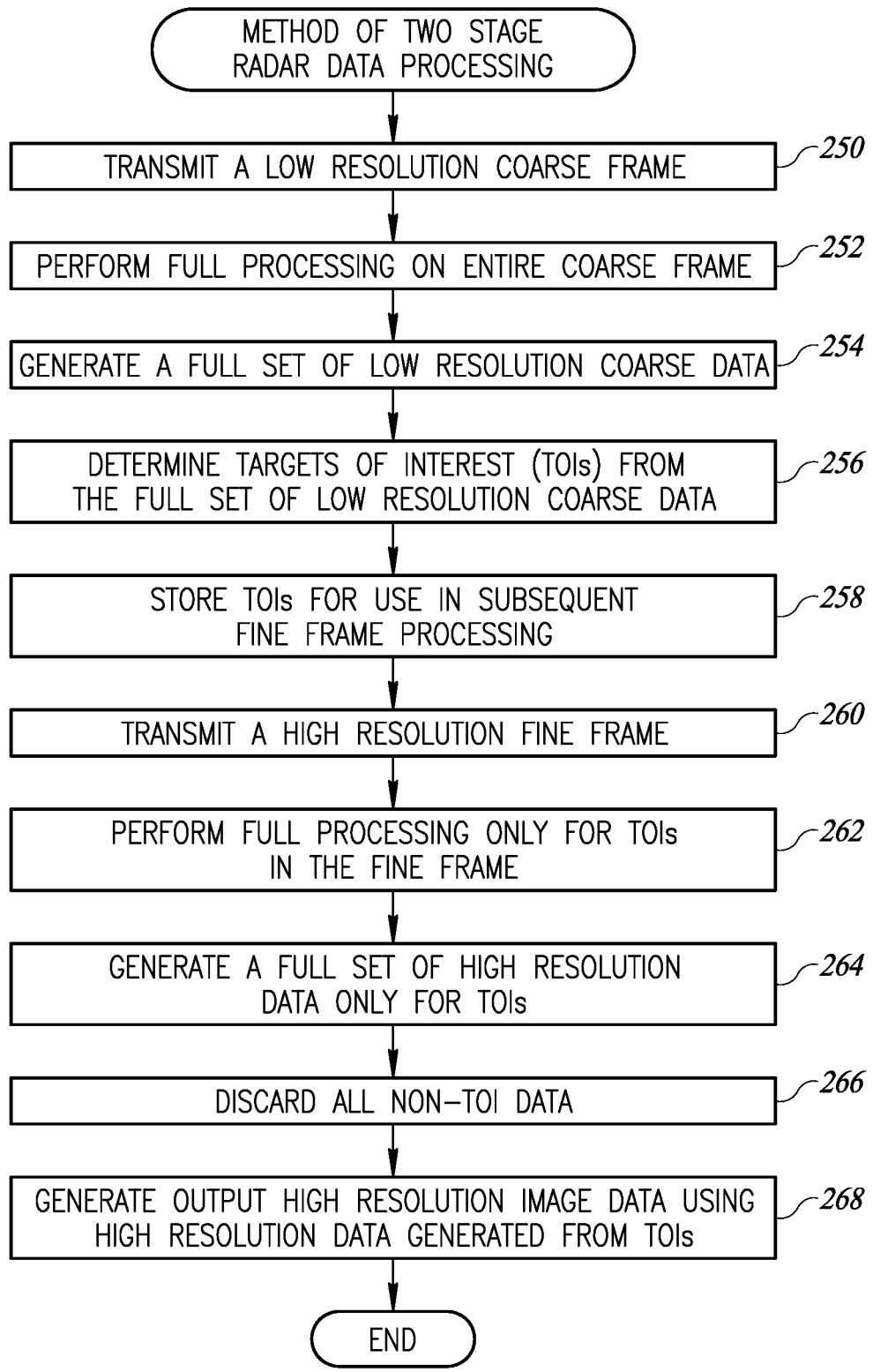
FIG. 16 is a flow chart illustrating an example two-stage radar data processing method of the present invention.

A flow chart illustrating an example two-stage radar data processing method of the present invention is shown in FIG. 16. First, a low resolution coarse frame is transmitted (step 250). Full processing on the entire coarse frame is performed regardless of whether any targets are detected (step 252). A full set of low resolution coarse data is generated (step 254). Targets of interest (TOIs) are then determined from the full set of low resolution coarse data (step 256). The TOIs generated are stored in memory for use in subsequent fine frame processing (step 258).

Note that the TOIs can be determined using any suitable algorithm. For example, the data points (e.g., amplitude) in the 4D matrix can be compared with the threshold. If the data point exceeds the threshold, it is added to the list of TOIs. The threshold itself may be uniform or dynamic, for example varying with range due to reduced radar return with greater range.

A high resolution frame is then transmitted (step 260). Full processing on the fine frame data is performed but only for the TOIs in the list (step 262). A full set of high resolution data is generated for the TOIs only (step 264). All non-TOI data is discarded or ignored (step 266). Output high resolution image data is generated using high resolution data generated from the TOI information (step 268). Note that in one embodiment, the image data comprises the 4D matrix of data which is typically sparse as non-TOI data is not processed. This reflects the fact that typical scenes encountered are only sparsely populated with targets. In addition, most scenes are stationary. Reflections are stationary or moving at human or car speeds. This results in the Doppler data being mostly empty. Thus, high resolution processing on the entire fine frame is not necessary. It is still desired, however, to distinguish between a car moving and a human moving which dictates the Doppler resolution required. By transmitting a coarse frame first at low resolution, the data processing requirements for the high resolution fine frame are greatly reduced. This significantly reduces processing time, required computing resources, and power consumption.

It is appreciated by one skilled in the art that the two-stage mechanism can be implemented in several different ways without departing from the scope of the invention. In particular, considering the coarse frame, there are several ways to reduce the processing required. For example, the resolution of one or more dimensions can be lowered as compared to the fine frame. The amount the resolution is lowered is also variable. In addition, the order of the four FFT operations can be rearranged so as to minimize the requirements for hardware circuitry. Either azimuth or elevation processing can be eliminated entirely to reduce the computation and time requirements during coarse frame processing. Further, depending on the implementation of the circuitry, the same hardware can be used to process both coarse and fine frames. Moreover, the amount of memory can be minimized in order to process the four dimensional FFT.

A radar signal processing circuit that implements the two-stage processing mechanism is provided by the present invention. The mechanism takes advantage of the fact that range processing (i.e. via DFT or FFT) can be performed on the fly (i.e. while the coarse or fine frame is transmitted over the air), thus saving processing latency. The memory required in this case is for a single chirp only. Once samples for a complete chirp are received, the range FFT is performed. Range processing does not require large hardware area, and does not increase the size of the radar data. Thus, the range dimension is processed first.

After range processing is performed, out of the remaining three dimensions, velocity (i.e. Doppler) is typically the sparsest. Therefore, for fine frames, velocity data is processed next, before azimuth and elevation. This significantly reduces the quantity of data required to be processed to generate output image data without any sacrifice in resolution.

Data for the entire frame after range processing must be stored before DAE processing (i.e. utilizing either DFT or FFT) can be performed. Either internal (i.e. on-chip) or external (i.e. off-chip) memory may be used. In either case, a relatively large memory is required which may be located externally if it is too large (i.e. costly) to be placed on-chip. In one embodiment, the radar signal processing is performed using three hardware processing circuit blocks.

Figure 17:
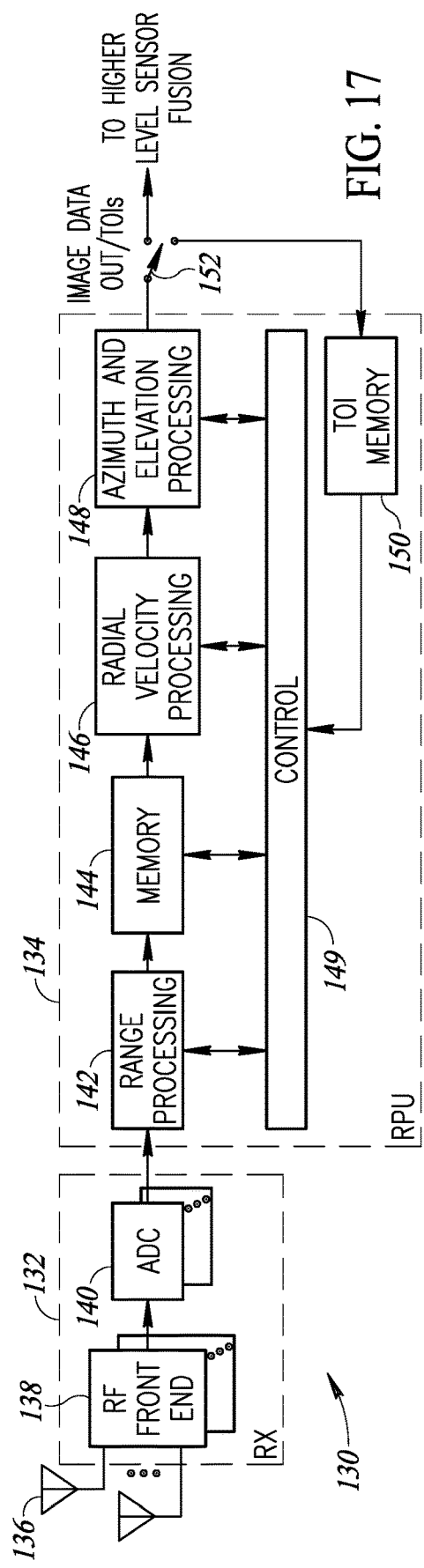
FIG. 17 is a block diagram illustrating an example two-stage data processing signal chain in accordance with the present invention.

A block diagram illustrating an example two-stage data processing signal chain in accordance with the present invention is shown in FIG. 17. The system, generally referenced 130, comprises a receiver circuit 132 and radar processing unit (RPU) circuit 134. The receiver 132 comprises one or more RF front end circuits 138 coupled to corresponding antennas 136. The receive signals are input to analog to digital converter (ADC) circuits 140. The RPU 134 comprises range processing circuit 142, memory 144, radial velocity (i.e. Doppler) processing circuit 146, azimuth and elevation processing circuit 148, control circuit 149, and TOI memory 150.

As described supra, the range FFT processing 142 is performed first, on the fly (i.e. while the frame is transmitted over the air). Its output is stored in memory 144. After the entire frame has been received, velocity or Doppler processing 146 is performed on the data read from the memory, followed by optional azimuth and elevation processing. Note that during fine frames, the amount of processing performed by circuit 146 is significantly reduced, since only a subset of the Doppler outputs (i.e. TOIs) needs to be processed. In addition, in one embodiment, rather than perform an FFT, a DFT is performed on the data during Doppler processing since it is more efficient (i.e. in time and hardware computation requirements) considering only a subset of the data is to be processed. Performing an FFT on the data would be inefficient in this case but can be used as well. In this case, the results of the FFT that are not used are discarded.

Finally, for fine frames, azimuth and elevation processing 148 are performed on the reduced data (i.e. TOIs) generated by the Doppler processing. The output of the processing chain is input to a switch 152 which directs either (1) output image data to higher level sensor fusion or (2) TOIs to TOI memory 150 where they are stored for use during fine frame processing. The control circuit 149 is functions to configure and control the various circuit blocks in the RPU as well as coordinate the fine frame processing using the list of TOIs stored in TOI memory 150.

Note that in one embodiment, the same hardware circuitry is used for processing both coarse and fine frames. This is possible since each is processed at different times and can thus be pipelined.

It is appreciated that the order of the signal processing may be different depending on the implementation of the invention. For example, Doppler processing can be performed before range processing, even though it is less efficient. In addition, the resolution of each processing block may be varied depending on the particular implementation.

In addition, in one embodiment, the receive data for each chirp is written to the memory (either internal or external) row by row. Once the chirp is complete and the data stored, it is immediately processed using FFT to generate range data which replaces the received sample data in each row. Once all chirps in the frame are processed, the range bins are read column by column and processed using FFT or DFT to generate velocity (Doppler) data which is written back into the memory replacing the original range data for a particular bin. Thus, range processing is performed per chirp and Doppler processing is performed per range bin.

Figure 18:
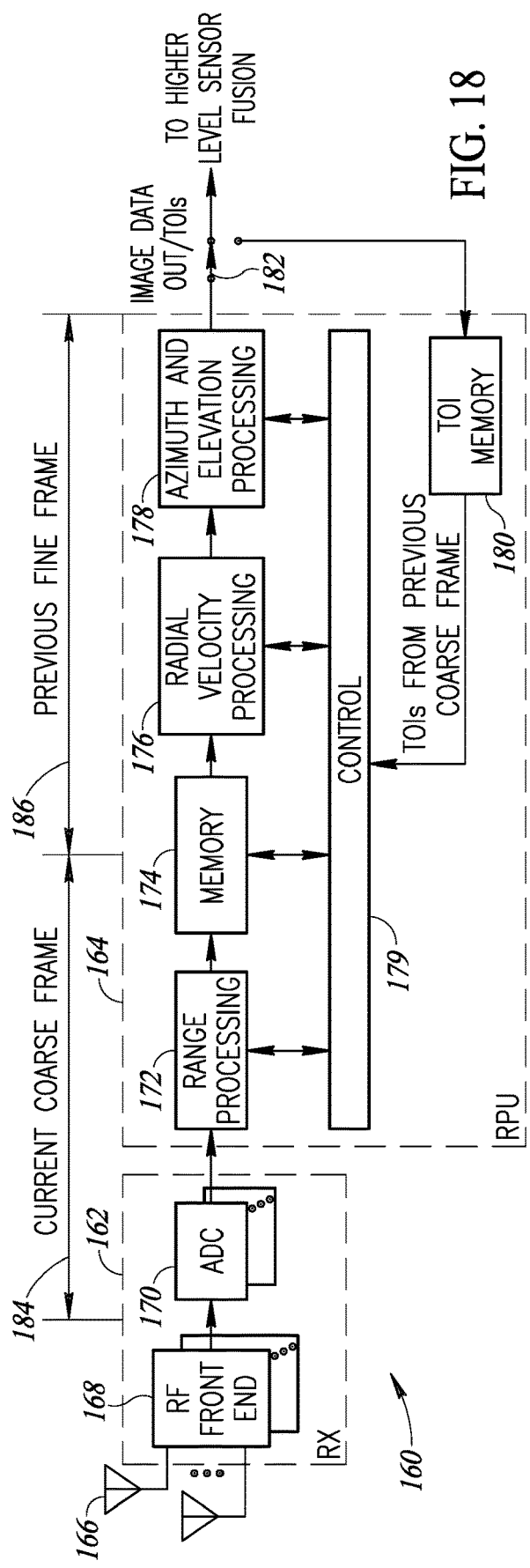
FIG. 18 is a block diagram illustrating a first example combined coarse frame and fine frame signal processing.

A block diagram illustrating a first example combined coarse frame and fine frame signal processing is shown in FIG. 18. The system, generally referenced 160, comprises a receiver circuit 162 and radar processing unit (RPU) circuit 164. The receiver 162 comprises one or more RF front end circuits 168 coupled to corresponding antennas 166. The receive signals are input to ADC circuits 170. The RPU 164 comprises range processing circuit 172, memory 174, Doppler processing circuit 176, azimuth and elevation processing circuit 178, control circuit 179, and TOI memory 180.

As described supra, a coarse frame (current coarse frame 184) is first transmitted. The range processing 172 is performed while the coarse frame is in the air and the results are stored in the memory 174. Due to pipelining, the previous fine frame 186 is being processed. The output image data is steered to higher levels for sensor data integration. The list of TOIs are read from TOI memory 180 by the control circuit 179 and used to determine the points to perform high resolution Doppler, azimuth, and elevation (DAE) processing on.

Figure 19:
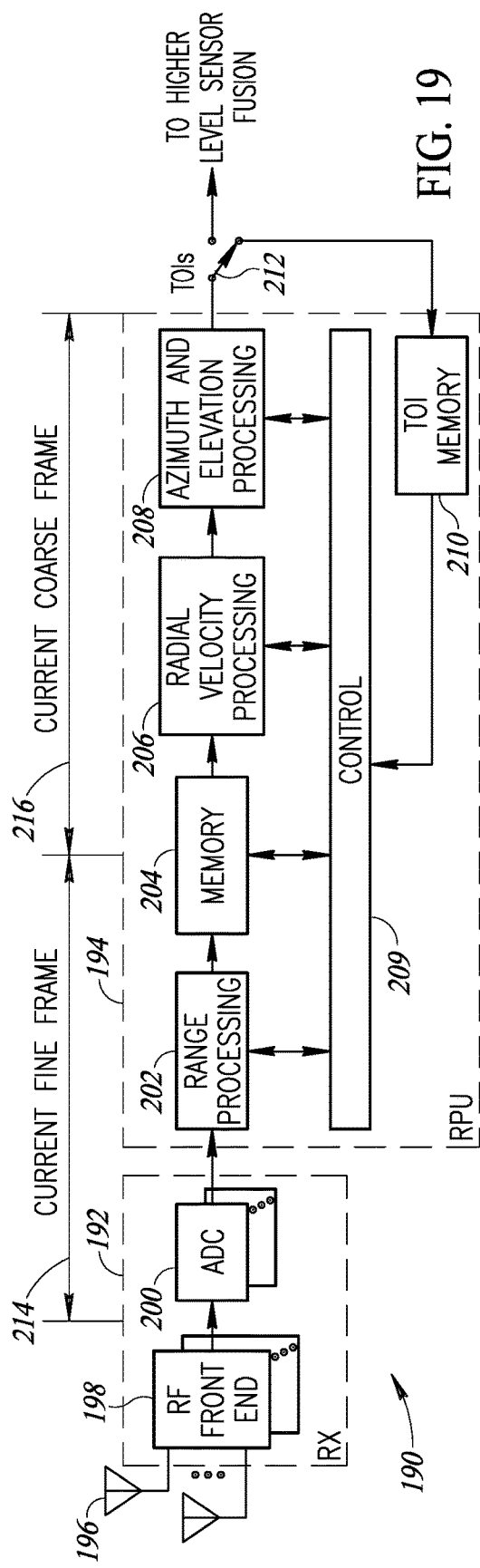
FIG. 19 is a block diagram illustrating a second example combined coarse frame and fine frame signal processing.

A block diagram illustrating a second example combined coarse frame and fine frame signal processing is shown in FIG. 19. The system, generally referenced 190, comprises a receiver circuit 192 and radar processing unit (RPU) circuit 194. The receiver 192 comprises one or more RF front end circuits 198 coupled to corresponding antennas 196. The receive signals are input to ADC circuits 200. The RPU 194 comprises range processing circuit 202, memory 204, Doppler processing circuit 206, azimuth and elevation processing circuit 208, control circuit 209, and TOI memory 210.

As described, following a coarse frame, a fine frame (current fine frame 214) is transmitted. The range processing 202 for the fine frame is performed while the frame is over the air and the result is stored in memory 204. At the same time, the low resolution processing of the Doppler, azimuth and elevation (DAE) dimensions is performed for the current coarse frame 216 and the result is a list of targets (TOIs) stored in TOI memory 210 to be used in the next frame.

Figure 20:
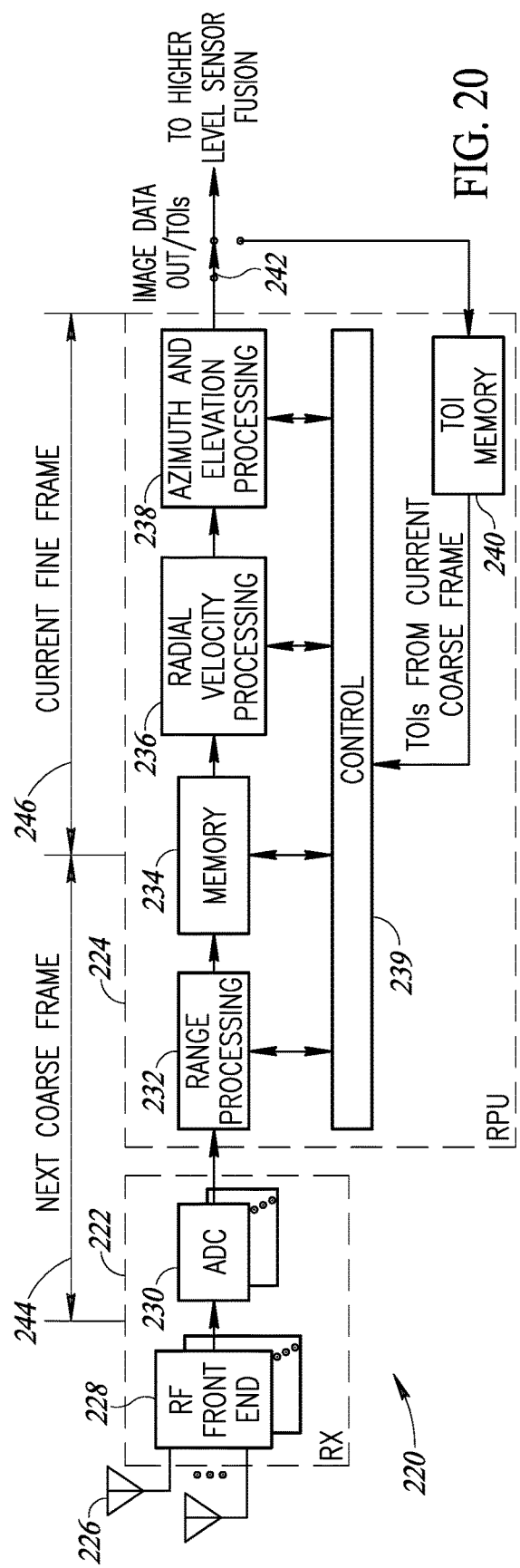
FIG. 20 is a block diagram illustrating a third example combined coarse frame and fine frame signal processing.

A block diagram illustrating a third example combined coarse frame and fine frame signal processing is shown in FIG. 20. The system, generally referenced 220, comprises a receiver circuit 222 and radar processing unit (RPU) circuit 224. The receiver 222 comprises one or more RF front end circuits 228 coupled to corresponding antennas 226. The receive signals are input to ADC circuits 230. The RPU 224 comprises range processing circuit 232, memory 234, Doppler processing circuit 236, azimuth and elevation processing circuit 238, control circuit 239, and TOI memory 240.

The next coarse frame (next coarse frame 244) is transmitted. The range processing 232 for the next coarse frame is done while the frame is over the air, and the result is stored in memory 234. At the same time, the processing of the Doppler, azimuth and elevation dimensions is done for the current fine frame 246 in accordance with the list of targets (TOIs) that were previously generated from processing of the current coarse frame.

Thus, in one embodiment, the two-stage processing mechanism is a pipelined processing method. A diagram illustrating a first example timeline for frame transmission, range processing and velocity (Doppler)/azimuth/elevation (DAE) processing for coarse and fine frames is shown in FIG. 21. Frame transmission, range and DAE processing are shown for several coarse and fine frames. Frame transmission follows range processing closely, lagging by one chirp since frames are range processed immediately after each chirp. As indicated, pipelining enables the same hardware circuits to be used for both coarse and fine frame processing. Processing for the coarse and fine frames alternates for both range and DAE processing, e.g., coarse frame #1, fine frame #1, coarse frame 2, fine frame #2, etc. Note that a fine frame always relates to the coarse frame that preceded it.

A diagram illustrating a second example timeline for frame transmission, range processing and velocity (Doppler)/azimuth/elevation (DAE) processing for coarse and fine frames 1 and 2 is shown in FIG. 22. This diagram is an alternate view of the coarse/fine transmission and frame pipeline processing. In this diagram, 'It' represents range processing and 'DAE' represents Doppler, azimuth, and elevation processing. Note that in this example, there is a gap in time between range and DAE processing for coarse frames. Depending on implementation, this may be due to range processing completing before the DAE processing on the previous fine frame is complete. Note that this gap typically occurs only when a coarse frame is transmitted after a fine frame. Gaps do not occur when transmitting consecutive coarse or fine frames. Note also that this gap becomes shorter as the scene becomes less crowded due to the fine frame processing only on TOIs. Thus, fine frame DAE processing time is variable depending on the scene. Note further that for every coarse frame, two fine frames A and B are transmitted and processed. In this case, the same list of TOIs are used for processing both fine frames.

The use of the two-stage processing mechanism of the present invention provides several advantages, including (1) efficient hardware use whereby the same hardware circuitry is used for both coarse and fine frame types; (2) efficient memory use whereby only one large memory block is required; (3) the list of targets from the coarse frame is ready just in time for the fine frame to use it, thereby minimizing processing latency; and (4) the amount of processing in the Doppler, azimuth and elevation dimensions is significantly reduced by using the coarse TOI list to narrow down the processing of the fine frame from a full grid to a partial grid.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of processing received data in a radar system, the method comprising:
   performing said data processing using two different frames, including a short low resolution coarse frame and a longer high resolution fine frame that are transmitted consecutively;
   receiving, in a radar processing circuit, coarse radar return data from transmitted coarse frames, performing range processing on each coarse frame on the fly while each coarse frame is transmitted, and processing said coarse radar return data received at a low resolution to extract one or more targets of interest (TOIs) having energy above a threshold; and
   receiving, in said radar processing circuit, fine radar return data from transmitted fine frames, performing range processing on each fine frame on the fly while each fine frame is transmitted, and processing said fine radar return data at high resolution only for said plurality of TOIs, and not for the entire full fine frame whereby all non-TOI data is ignored, in order to determine Doppler, azimuth, and elevation information for generating 4D radar output image data, thereby reducing processing time and compute resources required to generate said 4D radar output image data.

2. The method according to claim 1, further comprising discarding non-TOI data in said fine frame thereby reducing the amount of data to be processed.

3. The method according to claim 1, wherein said determining comprises comparing processed low resolution data to a threshold.

4. The method according to claim 3, wherein said threshold comprises a threshold that varies in accordance with range.

5. The method according to claim 1, wherein processing coarse frame data comprises performing at least one of range processing, radial velocity processing, azimuth processing, and/or elevation processing at a resolution less than that of said fine frame processing.

6. The method according to claim 1, wherein processing fine frame data comprises performing at least one of range processing, radial velocity processing, azimuth, and/or elevation processing at a resolution higher than that of said coarse frame processing.

7. The method according to claim 1, further comprising performing radial velocity processing on said received data after range processing but before azimuth and/or elevation processing thereby reducing azimuth and/or elevation processing time.

8. The method according to claim 1, wherein said fine frames have increased resolution due to receipt of radar data by said radar processing circuit that was transmitted by a transmitter adapted to use at least one of the techniques of increasing transmit signal bandwidth to increase range resolution, increasing the number of chirps to increase radial velocity resolution, increasing the number of horizontally oriented antennas to increase azimuth resolution, and increasing the number of vertically oriented antennas to increase elevation resolution.

9. The method according to claim 1, further comprising performing at least one of discrete Fourier transform (DFT) and fast Fourier transform (FFT) operations on said received data corresponding to said TOIs during said fine frame processing.

10. The method according to claim 1, further comprising storing said TOIs in a memory for use during said fine frame processing.

11. A radar processing circuit for processing received data in a radar system, comprising:
    a data processing circuit operative to:
    perform said data processing using two different frames, including a short low resolution coarse frame and a longer high resolution fine frame that are transmitted consecutively;
    receive coarse radar return data from transmitted coarse frames, performing range processing on each coarse frame on the fly while each coarse frame is transmitted, and processing said coarse radar return data received at a low resolution to generate one or more targets of interest (TOIs) having energy above a threshold; and
    receive fine radar return data from transmitted fine frames, performing range processing on each fine frame on the fly while each fine frame is transmitted, and processing said fine radar return data at high resolution only for said plurality of TOIs, and not for the entire full fine frame whereby all non-TOI data is ignored, in order to determine Doppler, azimuth, and elevation information for generating 4D radar output image data, thereby reducing processing time and compute resources required to generate said 4D radar output image data.

12. The radar processing circuit according to claim 11, wherein said data processing circuit is operative to discard or ignore non-TOI data in said fine frame thereby reducing the amount of data to be processed.

13. The radar processing circuit according to claim 11, wherein coarse frame data processing comprises performing at least one of range processing, radial velocity processing, azimuth processing, and/or elevation processing at a resolution less than that of said fine frame processing.

14. The radar processing circuit according to claim 11, wherein fine frame data processing comprises performing at least one of range processing, radial velocity processing, azimuth processing, and/or elevation processing at a resolution higher than that of said coarse frame processing.

15. The radar processing circuit according to claim 11, wherein both coarse frame and fine frame processing comprises performing radial velocity processing on said received data after range processing but before azimuth and/or elevation processing thereby reducing azimuth and/or elevation processing time.

16. The radar processing circuit according to claim 11, wherein said fine frames have increased resolution by using at least one of the techniques of increasing transmit signal bandwidth to increase range resolution, increasing the number of chirps to increase radial velocity resolution, increasing the number of horizontally oriented antennas to increase azimuth resolution, and increasing the number of vertically oriented antennas to increase elevation resolution.

17. An automotive radar sensor, comprising:
- a plurality of transmitter circuits coupled to respective transmitting antennas, each transmitter circuit operative to generate and couple transmitting signals to said transmitting antennas;
- a plurality of receiver circuits coupled to respective receiving antennas, each receiver circuit operative to receive reflected radar return signals;
- a digital radar processor (DRP) operative to control said plurality of transmitter circuits and said plurality of receiver circuits and to generate a radar image from received radar return signals;
- said DRP comprising a radar processing circuit operative to:
- perform processing of received radar return signals using two different frames, including a short low resolution coarse frame and a high resolution fine frame that are transmitted consecutively;
- transmit short low resolution coarse frames, performing range processing on each coarse frame on the fly while each coarse frame is transmitted, and process radar return data received therein at a low resolution to generate one or more targets of interest (TOIs) having energy above a threshold; and
- transmit a high resolution fine frame, performing range processing on each fine frame on the fly while each fine frame is transmitted, and processing said fine radar return at high resolution only for said plurality of TOIs and not for the entire full fine frame whereby all non-TOI radar return data is ignored, in order to determine Doppler, azimuth, and elevation information for generating 4D radar output image data, thereby reducing processing time to generate said 4D radar output image data.

18. The sensor according to claim 17, wherein said data processing circuit is operative to discard non-TOI data in said fine frame thereby reducing the amount of data to be processed.

19. The sensor according to claim 17, wherein coarse frame data processing comprises performing at least one of range processing, radial velocity processing, azimuth processing, and/or elevation processing at a resolution less than that of said fine frame processing.

20. The sensor according to claim 17, wherein fine frame data processing comprises performing at least one of range processing, radial velocity processing, azimuth processing, and/or elevation processing at a resolution higher than that of said coarse frame processing.

21. The sensor according to claim 17, wherein both coarse frame and fine frame processing comprises performing radial velocity processing on said received data after range processing but before azimuth and/or elevation processing thereby reducing azimuth and/or elevation processing time.

22. The sensor according to claim 17, wherein said fine frames have increased resolution by using at least one of the techniques of increasing transmit signal bandwidth to increase range resolution, increasing the number of chirps to increase radial velocity resolution, increasing the number of horizontally oriented antennas to increase azimuth resolution, and increasing the number of vertically oriented antennas to increase elevation resolution.

\* \* \* \* \*